Patented May 19, 1936

2,041,402

UNITED STATES PATENT OFFICE 2,041,402

MANUFACTURE OF NEW ENOLIC SULPHURIC ESTERS OF HYDROINDANTHRONES

David Alexander Whyte Fairweather, Laurieston, and Robert Fraser Thomson, Grangemouth, Scotland, assignors, by mesne assignments, to Scottish Dyes Limited, a company of Great Britain No Drawing. Application May 26, 1932, Serial No. 613,764. In Great Britain June 1, 1931

14 Claims. (Cl. 260—31)

This invention relates to the manufacture of new enolic sulphuric esters of hydroindanthrone, and includes processes for preparing such esters wherein tetra-sulphuric esters of dianthrahydroquinoneazines are subjected to controlled hydrolysis in an aqueous medium, the hydrolysis being effected by means of a mild oxidizing agent, preferably in the presence of a weak acid, to produce di-sulphuric ester azines. This invention also contemplates further treatment of these di-sulphuric esters to remove still another ester group and form the mono-sulphuric esters, and a process for separating the isomeric di-sulphuric esters formed during the first step of the hydrolysis and the products obtainable therefrom, all as more fully hereinafter described.

By the term "hydroindanthrones" we mean those reduction products of 1,2,2',1'-dianthraquinonedihydroazine and 1,2,2',1'-dianthraquinoneazine, containing one or more hydroxy groups in the 9, 10, 9' or 10' positions and their substituted derivatives. By the terms "dianthrahydroquinoneazine" and "anthraquinoneanthrahydroquinoneazine" we refer to those compounds generally considered as indanthrones, wherein the azine groups connect the anthraquinone or anthrahydroquinone groups in the 1,2,2',1' positions. In speaking of the esters in this application, we refer to the sulphuric esters.

We use the term "hydroindanthrones" as synonymous with reduced dianthraquinonedihydroazines or -azines.

In British Patent 359,889 (U. S. application Ser. No. 530,724), by one of the present joint inventors and another, there is described the production and application of new esters of hydroindanthrones from other esters of hydroindanthrones, especially from the dianthrahydroquinoneazine tetra-sulphuric esters (tetrahydrodianthraquinoneazine tetra-sulphuric esters), by controlled hydrolysis. The present application is directed to effecting this hydrolysis in the presence of mild oxidizing agents.

We have now found that if the tetra-esters of dianthrahydroquinoneazines are treated with oxidizing agents under alkaline or very weakly acid conditions, products are obtained which appear to be new esters of hydroindanthrone. The new esters contain fewer sulphuric ester groups than the esters used as the starting material, the sulphuric ester groups being controlledly removed by hydrolysis under alkaline or weakly acid conditions. It is to be noted that although the agents we use are oxidizing agents, the process is not necessarily an oxidation process, and it appears that in some instances at least it is not. The presence of oxidizing agents during the hydrolysis facilitates the control of the hydrolysis and influences the products obtained. In our process it is not necessary that the oxidizing agents react vigorously with the esters to form highly oxidized products. In some instances only a slight oxidation of a small portion of the ester results. We have found, for instance, that if the tetra-ester of dianthrahydroquinoneazine is treated with a mixture of borax, boric acid and sodium hypochlorite at 50° C., a product is obtained which appears to be a mixture of principally dianthrahydroquinoneazine di-sulphuric ester together with a smaller proportion of anthraquinoneanthrahydroquinoneazine di-sulphuric ester having the probable formula

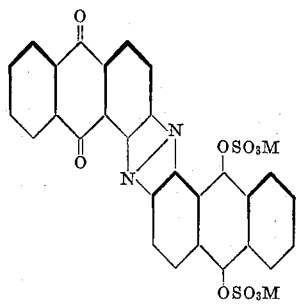

wherein M represents hydrogen or an alkali metal.

The dianthrahydroquinoneazine di-sulphuric ester appears to contain the two sulphuric ester groups in different anthraquinone nuclei; such a compound theoretically is capable of existing in three isomeric forms having the following probable formulas

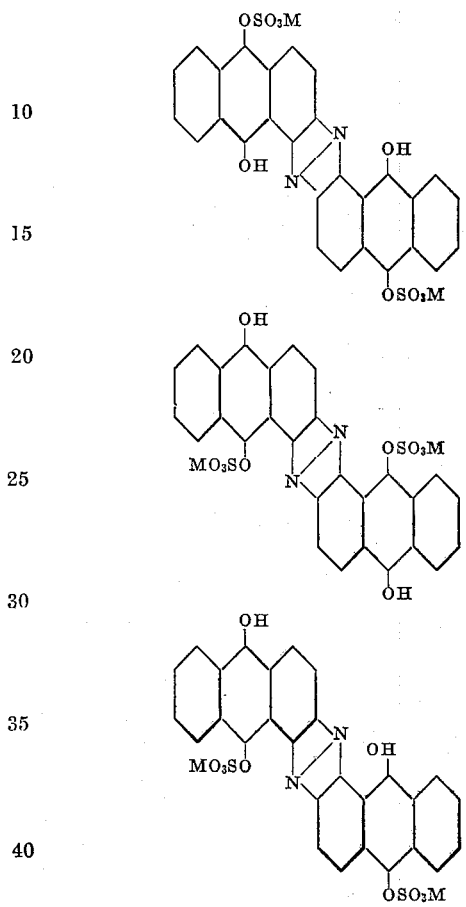

wherein M has the same significance as above, according as one or both of the sulphuric ester groups are adjacent to or distant from the nitrogen atoms, and of those three forms, at least two appear to be actually present in the body which we obtain.

As oxidizing agents we prefer the use of alkali forming metal hypochlorites, alkali forming metal hypochlorites in the presence of an acid such as boric or carbonic, and persulphates in alkaline solution.

We have also found that this new diester when treated with cold dilute mineral acid is converted to another new product which appears to be the mono-ester of anthraquinoneanthrahydroquinonehydroazine and is apparently formed by the removal of one of the ester groups with simultaneous conversion of the azine to the hydroazine. Of the two possible isomeric forms, both appear to be present.

We have also found that on heating this mono-ester with dilute mineral acid a body which is apparently leuco indanthrone is produced.

The invention includes the use of substituted sulphuric esters as starting materials, especially halogen substituted and methyl substituted derivatives. Of special interest is 3:3′-dichlorodianthrahydroquinoneazine tetra-sulphuric ester.

We have further found that these new esters can be used in the art of coloring, for instance by impregnating the material and then heating with dilute mineral acid. The addition of an oxidizing agent as is necessary with other esters, excepting self oxidizing esters referred to in the specification above mentioned, does not appear to be essential in using these esters, the leuco-indanthrone formed being easily oxidized by atmospheric air.

The invention consists in a process for the production of sulphuric esters of reduced dianthraquinonedihydroazines according to which the tetra-sulphuric esters of dianthrahydroquinoneazine or dihydroazine or their substitution products are treated with oxidizing agents, preferably alkali-forming metal hypochlorites, alkali-forming metal hypochlorites in the presence of an acid such as boric or carbonic, and persulphates in alkaline solution, followed if desired by the product being freed from any di-sulphuric ester of anthraquinoneanthrahydroquinoneazine. The invention also consists in a process for the production of sulphuric esters of reduced dianthraquinonedihydroazine according to which the di-sulphuric esters of dianthrahydroquinoneazines or their substitution products are converted by acid treatment, preferably cold dilute mineral acid treatment, to mono-sulphuric esters of anthraquinoneanthrahydroquinonehydroazines.

The invention also consists in the utilization of the di-sulphuric esters of dianthrahydroquinones and mono-sulphuric esters of anthraquinoneanthrahydroquinonehydroazines such as may be made by the process of the preceding paragraphs as coloring matters, including the development of the aforesaid di-sulphuric esters by the action of heat in an acid solution. It also includes products including colored materials obtained by the preceeding processes.

The invention is illustrated by the following examples in which the parts are by weight:

*Example 1*

This is an example of the production of a mixture of dianthrahydroquinoneazine di-sulphuric ester and anthraquinoneanthrahydroquinoneazine di-sulphuric ester.

40 parts of the potassium salt of anthrahydroquinoneazine tetra-sulphuric ester are dissolved together with 16 parts of borax in 170 parts of water. At 50° C. there are added 6 parts of boric acid and then sodium hypochlorite liquor corresponding to about 10 parts of 100% sodium hypochlorite, the temperature is kept at 50° and the reaction is complete in about two hours. The reaction mass becomes dark reddish-brown in color.

The liquor is finally made alkaline with caustic soda and any excess of hypochlorite destroyed. It is then ready for use in dyeing or it may be salted out. Alternatively it may be evaporated, preferably in a vacuum, or spray-dried.

The product appears to consist principally of a mixture of two of the isomeric di-sulphuric esters of dianthrahydroquinoneazine, with a little of the di-sulphuric ester of anthraquinoneanthrahydroquinoneazine.

This di-sulphuric ester may be isolated separately by filtering the precipitate which is formed after the addition of a moderate quantity of sodium chloride. Further details of separation will be found in Example 4.

A similar method is applicable to 3:3′-dichlorodihydrodianthraquinoneazine, the product being in this case 3:3′-dichlorodianthrahydroquinoneazine di-sulphuric ester.

Example 2

This is another example of the production of a mixture of dianthrahydroquinoneazine di-sulphuric ester and anthraquinoneanthrahydroquinoneazine di-sulphuric ester.

40 parts of the potassium salt of dianthrahydroquinoneazine tetra-sulphuric ester are dissolved in 300 parts of 3.5% sodium carbonate solution, and 40 parts of 16% sodium hypochlorite liquor are then added. After cooling to 0° C. a slow stream of carbon dioxide is led in until all the hypochlorous acid has been liberated and carbon dioxide passes freely through the liquid. The stirring is continued for several hours at 0° C. to complete the reaction, and if necessary sulphite is added to destroy any remaining hypochlorous acid. The dark brown liquor is ready without further treatment for dyeing or printing, or it may be separated into two or three fractions as described in Example 4.

Example 3

This is another example of the production of a mixture of dianthrahydroquinoneazine di-sulphuric ester and anthraquinoneanthrahydroquinoneazine di-sulphuric ester.

40 parts of the potassium salt of dianthrahydroquinoneazine tetra-sulphuric ester are dissolved in 300 parts of water containing 5 parts of sodium carbonate. The solution is cooled to 0°, 8 parts of sodium bicarbonate are added and 7 parts of chlorine are passed in during 3 hours. The mixture is stirred for several hours more to complete the reaction. The subsequent working up is the same as in the previous examples.

Example 4

This is an example of the separation of the products of Example 1, the method being also applicable to the products of Examples 2 and 3.

The suspension remaining after treating with caustic soda and removing the excess of hypochlorite in Example 1, is gently warmed and filtered. The filter-cake consists of anthraquinoneanthrahydroquinoneazine di-sulphuric ester. It is washed with saturated solution of potassium chloride and can then, if desired, be crystallized by dissolving in water, filtering and precipitating with sodium chloride. The main filtrates contain the anthrahydroquinoneazine di-sulphuric esters. As previously mentioned, at least two isomers appear to be present. They can be isolated together by evaporating the solution, or they can be separated by salting out with solid potassium chloride when a less soluble fraction is precipitated and a more soluble one remains and can be isolated by evaporation.

Example 5

This is an example of the application of the di-sulphuric ester of dianthrahydroquinoneazine for the dyeing of cotton by the padding method. The cotton is padded in a bath containing 1% (calculated as indanthrone) of the product of Example 1, dried and developed in a bath containing 15% sodium chloride and ½–¾% sulphuric acid at 80° for 15–30 minutes. Soaping can then be carried out in the usual way.

Example 6

This is an example of the application of the same product as that used in Example 1, but for printing instead of padding. The dyestuff paste is made up by mixing the following:—

| | Parts |
|---|---|
| Dyestuff paste (10% strength as indanthrone) | 15 |
| Glycerine | 4 |
| British gum thickening | 81 |
| | 100 |

The cloth is printed with this paste and then either steamed or simply dried and then developed.

Exampe 7

This is an example of the use of the di-sulphuric ester of anthraquinoneanthrahydroquinoneazine for the dyeing of cotton by the padding method. The cotton is padded from a bath containing 1% (calculated as indanthrone) of the ester, squeezed, dried and developed by immersion in a cold solution of 5 parts per 1000 of 30% hydrochloric acid liquor. Development takes place immediately.

Instead of using the di-sulphuric ester above mentioned, the di-sulphuric ester of 3:3-dichloroanthraquinoneanthrahydroquinoneazine may be used. Dyeing may be carried out on wool, or other fibres as well as on cotton.

In the claims below it should be understood that where new products, dyestuffs or articles of manufacture are claimed, we mean to include these bodies not only in substance, but also in whatever state they exist when applied to material dyed, printed, or pigmented therewith.

We claim:

1. A process for preparing disulphuric esters of a dianthrahydroquinoneazine which comprises subjecting a tetrasulphuric ester of a dianthrahydroquinoneazine to the action of a mild oxidizing agent in an aqueous solution ranging from alkaline to very weakly acid in character.

2. A process for preparing disulphuric esters of a dianthrahydroquinoneazine which comprises subjecting a tetrasulphuric ester of a dianthrahydroquinoneazine to the action of a mild oxidizing agent and a weak acid in aqueous solution.

3. The process of claim 2, wherein the oxidizing agent used is an alkali forming metal hypochlorite.

4. The process of claim 2, wherein the weak acid used is carbonic acid.

5. The process of claim 2, wherein the disulphuric esters so formed are separated from the resulting mass by a salting operation.

6. The process of claim 2, wherein the resulting solution is filtered, and the disulphuric esters of dianthrahydroquinoneazine in the filtrate are isolated.

7. The process of claim 2, wherein the resulting solution is filtered, and the disulphuric esters of dianthrahydroquinoneazine in the filtrate are isolated by evaporating the solution.

8. In the process for preparing disulphuric esters of a dianthrahydroquinoneazine, the step of separating isomeric disulphuric esters formed by the controlled hydrolysis of tetrasulphuric esters of dianthrahydroquinoneazines with a mild oxidizing agent in alkaline to weakly acid aqueous solutions which comprises filtering off the di-ester which precipitates out in the warm reaction solution when it is maintained or rendered alkaline, and recovering the more soluble ester from the filtrate.

9. Disulphuric enolic esters of a dianthrahydroquinoneazine in which the sulphuric ester groups are attached to different anthraquinone nuclei.

10. Disulphuric esters of dianthrahydroquinoneazine in which the sulphuric ester groups are attached to different anthraquinone nuclei.

11. Disulphuric enolic esters of a dihalogendianthrahydroquinoneazine in which the sulphuric ester groups are attached to different anthraquinone nuclei.

12. Disulphuric esters of 3,3'-dichlorodianthrahydroquinoneazine in which the sulphuric ester groups are attached to different anthraquinone nuclei.

13. A disulphuric ester of dianthrahydroquinoneazine in which the sulphuric ester groups are attached to different anthraquinone nuclei and which in the dry state is brown in color, and which is converted to indanthrone when warmed with a dilute mineral acid.

14. A dissulphuric ester of 3,3'-dihalogendianthrahydroquinoneazine in which the sulphuric ester groups are attached to different anthraquinone nuclei and which in crystalline form is brown in color and which is regenerated to the corresponding indanthrone compound when warmed with a dilute mineral acid.

DAVID A. W. FAIRWEATHER.
ROBERT FRASER THOMSON.

CERTIFICATE OF CORRECTION.

Patent No. 2,041,402. May 19, 1936.

DAVID ALEXANDER WHYTE FAIRWEATHER, ET AL.

It is hereby certified that error appears in the printed specification of the above numbered patent requiring correction as follows: Page 2, second column, line 46, for the syllable "anthrahydro-" read dianthrahydro-; page 3, first column, line 52, for the word "anthrahydroquinoneazine" read dianthranydroquinoneazine; page 4, second column, line 5, claim 14, for "dissulphuric" read disulphuric; and that the said Letters Patent should be read with these corrections therein that the same may conform to the record of the case in the Patent Office.

Signed and sealed this 18th day of August, A. D. 1936.

Henry Van Arsdale

(Seal) Acting Commissioner of Patents.